(12) United States Patent
Hirai

(10) Patent No.: US 9,098,273 B2
(45) Date of Patent: Aug. 4, 2015

(54) ELECTRONIC APPARATUS, METHOD FOR CONTROLLING POWER STATE THEREOF, AND STORAGE MEDIUM STORING THE SAME

(75) Inventor: Masahito Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 888 days.

(21) Appl. No.: 12/395,322

(22) Filed: Feb. 27, 2009

(65) Prior Publication Data

US 2009/0222680 A1  Sep. 3, 2009

(30) Foreign Application Priority Data

Feb. 28, 2008  (JP) .................................. 2008-048538

(51) Int. Cl.
*G06F 1/32*  (2006.01)
(52) U.S. Cl.
CPC ............ *G06F 1/3203* (2013.01); *G06F 1/3284* (2013.01); *Y02B 60/1267* (2013.01)
(58) Field of Classification Search
CPC ..... G06F 1/3209; G06F 1/3215; G06F 1/325; G06F 1/3284; G06F 3/12; G06F 3/1201; G06F 3/1221; G06F 1/26; G06F 1/32; G06F 1/3203; G06F 1/3206; G06F 1/3234; G06F 3/1229; G06F 1/00; Y02B 60/1267; Y02B 60/12; Y02B 60/1278; Y02B 60/1232; H04L 41/0833

USPC .................. 713/300, 310, 320–324, 330, 340
See application file for complete search history.

(56) References Cited

U.S. PATENT DOCUMENTS

| | | | |
|---|---|---|---|
| 5,196,728 A * | 3/1993 | Jaux .............................. | 307/10.1 |
| 6,459,496 B1 * | 10/2002 | Okazawa ...................... | 358/1.14 |
| 6,618,813 B1 * | 9/2003 | Hsu et al. ...................... | 713/323 |
| 2006/0187480 A1 * | 8/2006 | Tsuchiya et al. ............. | 358/1.13 |
| 2006/0200704 A1 * | 9/2006 | Takahashi et al. .............. | 714/38 |
| 2006/0265473 A1 * | 11/2006 | Muto ............................ | 709/218 |
| 2007/0240002 A1 * | 10/2007 | Motoyama .................... | 713/320 |
| 2009/0094468 A1 * | 4/2009 | Larson .......................... | 713/310 |

FOREIGN PATENT DOCUMENTS

| | | |
|---|---|---|
| JP | 03-212715 A | 9/1991 |
| JP | 07-195801 A | 8/1995 |
| JP | 2002-163049 A | 6/2002 |
| JP | 2004-199477 A | 7/2004 |
| JP | 2009-116502 A | 5/2009 |

\* cited by examiner

*Primary Examiner* — Fahmida Rahman

(74) *Attorney, Agent, or Firm* — Canon USA, Inc. IP Division

(57) ABSTRACT

An electronic apparatus includes a first acquisition unit configured to acquire first instruction information transmitted from an external apparatus, which instructs changing of a power state to a normal energized state, a second acquisition unit configured to acquire second instruction information transmitted from the external apparatus, which instructs changing of the power state to a power saving state, and a power state change unit configured to change the power state from the normal energized state to the power saving state based on an acquisition state of the first instruction information and the second instruction information.

5 Claims, 11 Drawing Sheets

| IP ADDRESS |
|---|
| 192.168.1.1 |
| 192.168.1.3 |
| 192.168.1.2 |
| 192.168.1.6 |
| 192.168.1.9 |
| 192.168.1.10 |

(PRIOR ART)

ELECTRONIC APPARATUS, METHOD FOR CONTROLLING POWER STATE THEREOF, AND STORAGE MEDIUM STORING THE SAME

BACKGROUND OF THE INVENTION

1. Field of the Invention

The present invention generally relates to an electronic apparatus, a method for controlling the power state thereof, and a storage medium for storing a program to realize the method. Aspects of the present invention may be applied to an electronic apparatus for controlling the power state thereof.

2. Description of the Related Art

A conventional printing apparatus may be in a normal energized state when communication with another apparatus is executed in order to print or acquire information and the like, and may change its state from the normal energized state to a power saving state when the communication with the other apparatus is finished.

FIG. 10 is a diagram illustrating an example of an internal configuration of such a printing apparatus.

In the example shown in FIG. 10, the power saving state is the state where a power source 1002 supplies power only to a local area network (LAN) controller 1001. To change from this power saving state to the normal energized state, first, the LAN controller 1001 identifies an electric signal (packet) input from a LAN 1003. Then, if the LAN controller 1001 determines based on the identified result that the power state is to be changed to the normal energized state, the LAN controller 1001 issues an order to the power source 1002 to energize a controller 1004. Further, the LAN controller 1001 issues an order to the power source 1002 to energize an apparatus body 1005, which includes a printer engine, for the actions of a printing request and the like.

Generally, to restore to the normal energized state from the power saving state, processing for initializing the controller 1004 and the apparatus body 1005 is typically performed, which takes a certain amount of time. Therefore, it may not be desirable to change the state unnecessarily. Further, if consumable parts, such as a hard disk and the like, are connected to the controller 1004, it may not be desirable to change the state unnecessarily.

A printing apparatus having such a power saving state function does not have a unit for explicitly determining whether communication with another apparatus is finished. Thus, as illustrated for example in FIG. 11, the printing apparatus may conventionally employ a mechanism that changes the power state from the normal energized state to the power saving state after a predetermined period of time has elapsed since the last communication with another apparatus.

However, there is a risk with such a mechanism that changes the power state from the normal energized state to the power saving state after a predetermined period of time has elapsed since the last communication with another apparatus, in that the energized state may be maintained for longer than is necessary. As illustrated in FIG. 12, a method to deal with this may be to simply shorten the waiting time (i.e., the above "predetermined period of time") for changing to the power saving state. However, if this is employed, the power state can sometimes be changed from the normal energized state to the power saving state even though continuing packet communication is not finished, which is generally inefficient.

In another mechanism, as discussed in Japanese Patent Application Laid-Open No. 11-231977, a client changes the power state from the normal energized state to the power saving state in response to a control signal from a server. However, this mechanism can be applied only between a pair of apparatuses. Therefore, when communicating with a plurality of apparatuses, the timing for changing the power state to the power saving state cannot be determined properly, so that the change to the power saving state cannot be performed at the appropriate time.

Furthermore, according to another mechanism the state of use of terminal apparatuses is collected, and the power state of the terminal apparatuses is changed from the normal energized state to the power saving state when a predetermined time, which is determined based on the collected state of use, has elapsed, as discussed in Japanese Patent Application Laid-Open No. 2003-256086. However, as described above, this mechanism may be inefficient, as the apparatus may be required to wait for a predetermined time in order to change to the power saving state.

Furthermore, according to yet another mechanism a peripheral apparatus transmits a response request at intervals of a predetermined time period to an information processing apparatus, to which there is a record of access, and if a response is not obtained for that response request, the power state is changed from the normal energized state to the power saving state, as discussed in Japanese Patent Application Laid-Open No. 2007-108862. However, in this mechanism, the information processing apparatus has to respond to a response request at intervals of a predetermined time period, during which the peripheral apparatus cannot be changed to the power saving state.

SUMMARY OF THE INVENTION

According to an aspect of the present invention, an electronic apparatus includes a first acquisition unit configured to acquire first instruction information transmitted from an external apparatus, which instructs changing of a power state to a normal energized state, a second acquisition unit configured to acquire second instruction information transmitted from the external apparatus, which instructs changing of the power state to a power saving state form the normal energized state, and a power state change unit configured to change the power state to the power saving state from the normal energized state to the power saving state based on an acquisition state of the first instruction information and the second instruction information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 9 is a diagram illustrating an example of a list, in which external apparatus addresses are registered according to the third exemplary embodiment of the present invention.

DETAILED DESCRIPTION OF THE EMBODIMENTS

Various exemplary embodiments, features, and aspects of the invention will be described in detail below with reference to the drawings.

Figure 1:
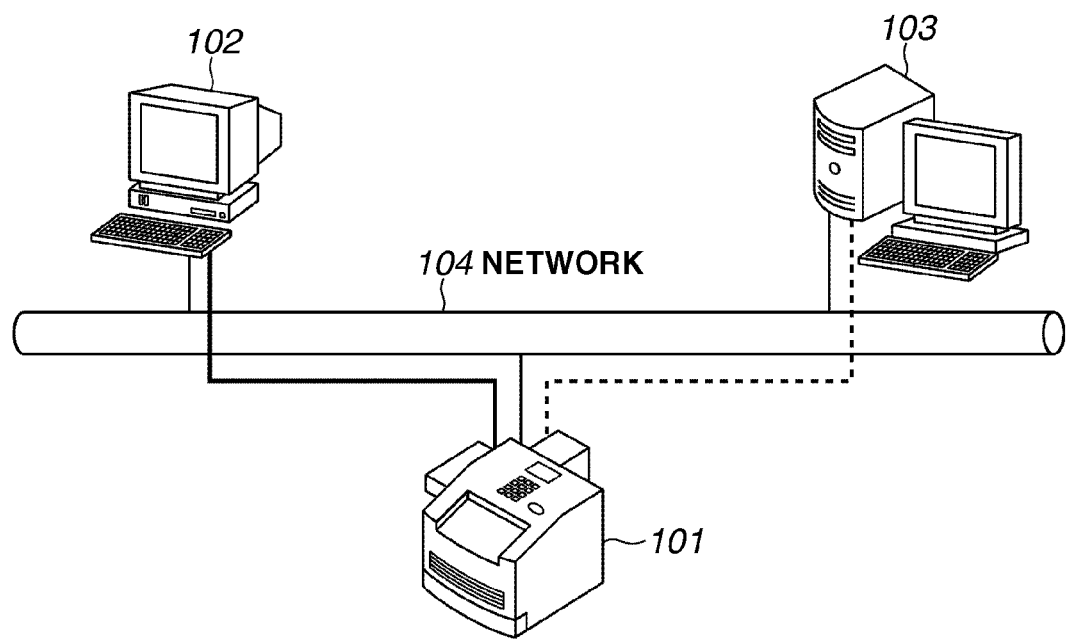
FIG. 1 is a diagram illustrating an example of a configuration of a printing system according to a first exemplary embodiment of the present invention.
Figure 10:
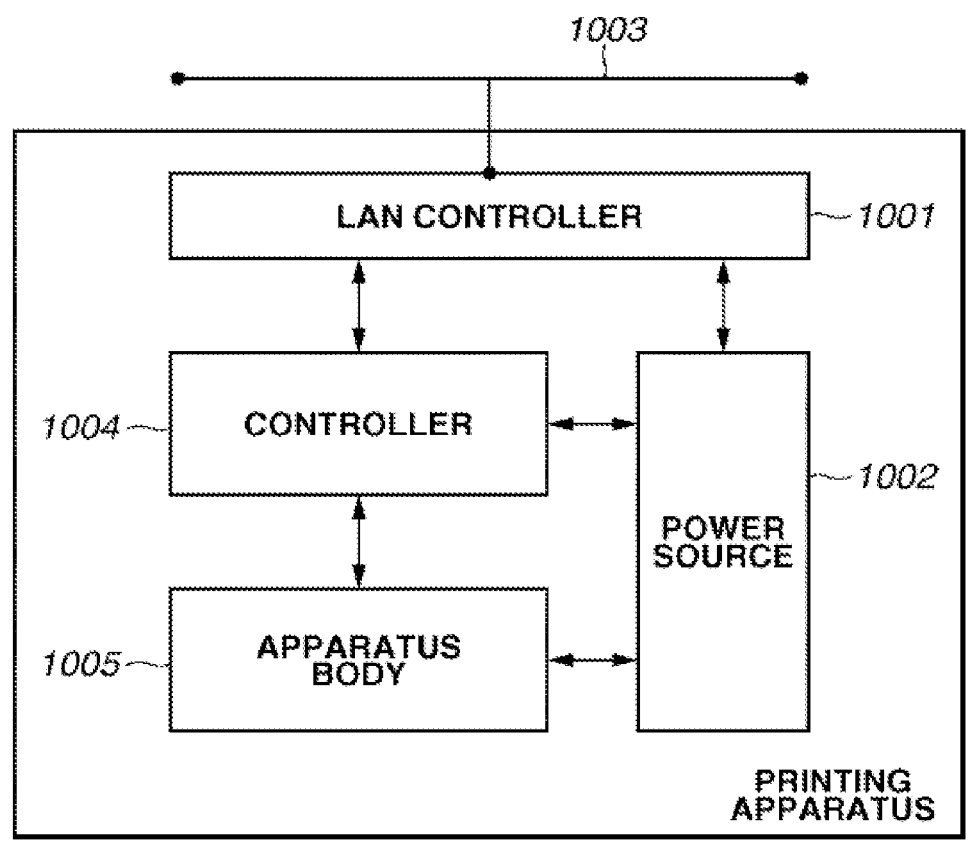
FIG. 10 is a diagram illustrating an example of the internal configuration of a printing apparatus.
Figure 11:
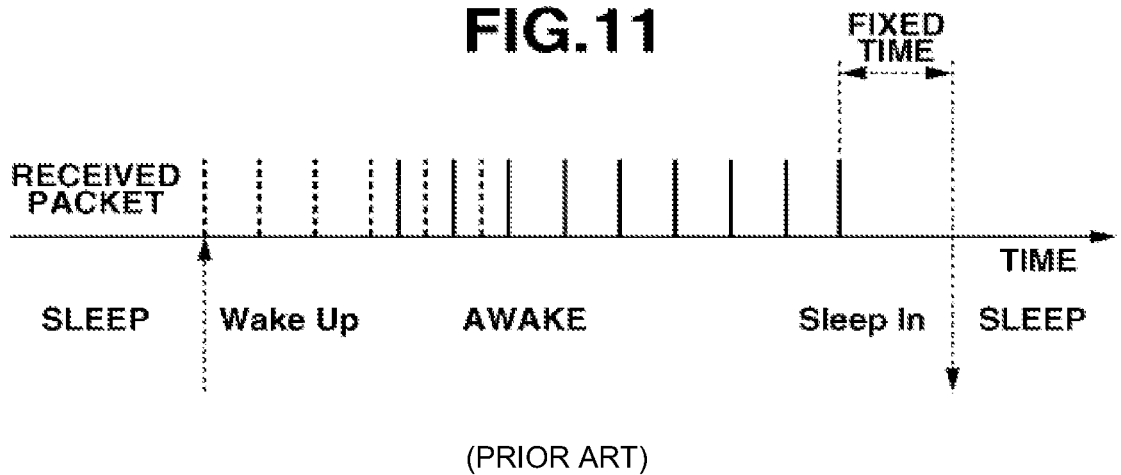
FIG. 11 is a diagram illustrating an example of temporal relationship between a packet received by a conventional printing apparatus and a power state.
Figure 12:
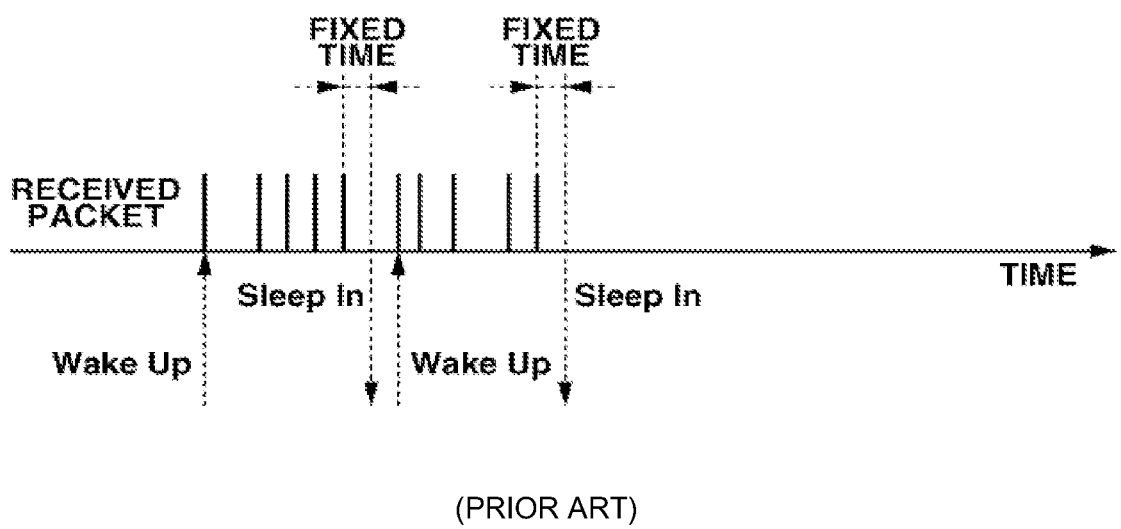
FIG. 12 is a diagram illustrating another example of temporal relationship between a packet received by a conventional printing apparatus and a power state.

FIG. 1 is a diagram illustrating an example of a configuration of a printing system according to a first exemplary embodiment of the present invention. In FIG. 1, the embodiment of the printing system has a printing apparatus 101, a client terminal apparatus (e.g., a user personal computer (PC)) 102, and a server 103. The printing apparatus 101, the client terminal apparatus 102, and the server 103 can communicate with each other via a network 104. In the present exemplary embodiment, the network 104 is a local area network (LAN). The printing apparatus 101 has an internal configuration, an example of which may correspond to the embodiment illustrated in FIG. 10, and has the ability to change the power state from a normal energized state (i.e., a baseline or first energized state) to a power saving state. The power saving state may be as described above (i.e., a state that uses less power than the normal energized state).

Figure 2:
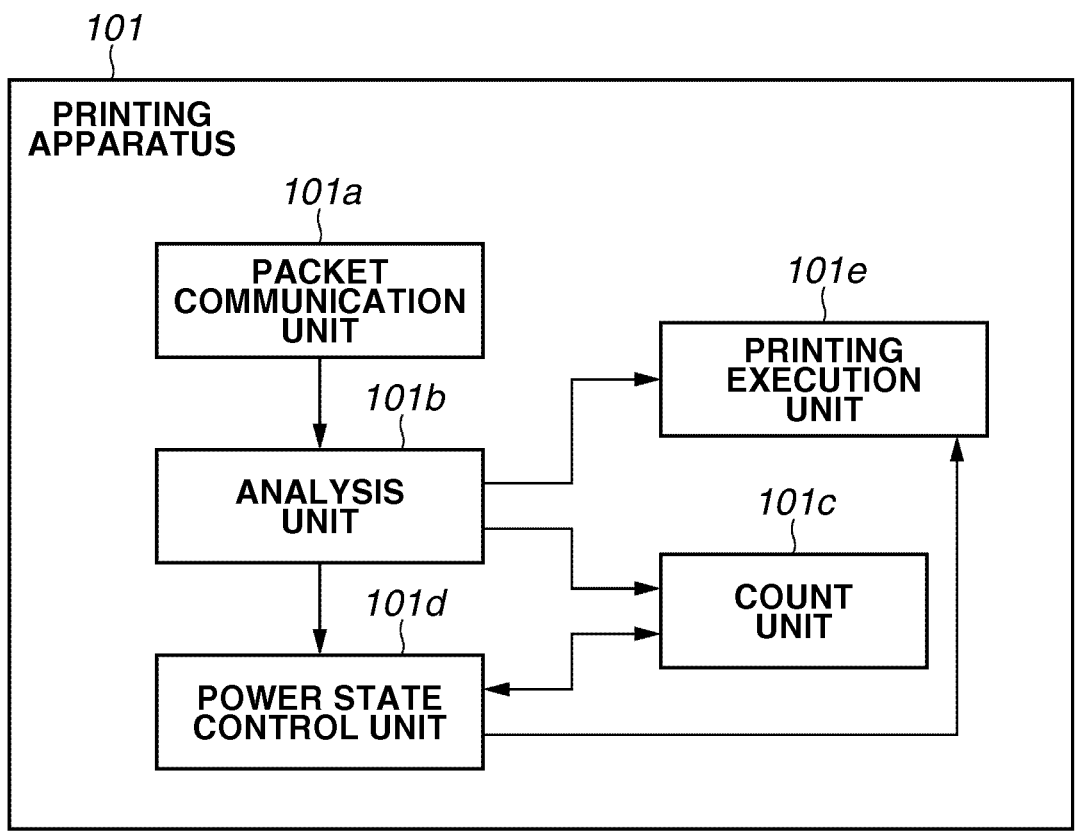
FIG. 2 is a diagram illustrating an example of a functional configuration of the printing apparatus according to the first exemplary embodiment of the present invention.

FIG. 2 is a block diagram illustrating an example of a functional configuration of the printing apparatus 101. In the example as shown in FIG. 2, a packet communication unit 101a performs packet communication with the client terminal apparatus 102, which uses the printing apparatus 101, and the server 103. This packet communication unit 101a can be realized, for example, by using the LAN controller 1001 illustrated in FIG. 10.

According to the embodiment, an analysis unit 101b analyzes the contents of the packets received by the packet communication unit 101a. In one version, as is described below, if the analysis unit 101b determines that a Wake Up packet, which is a packet indicating that the power state be restored from the power saving state to the normal energized state, has been received from the client terminal apparatus 102 or the server 103, the analysis unit 101b performs the following processing. That is, the analysis unit 101b adds "1" to the value of the "counter of the communication party" in a count unit 101c. On the other hand, if the analysis unit 101b determines that a Sleep In packet, which is a packet indicating that the power state is permitted to be changed from the normal energized state to the power saving state, has been received from the client terminal apparatus 102 or the server 103, the analysis unit 101b performs the following processing. That is, the analysis unit 101b subtracts "1" from the value of the "counter of the communication party" in the count unit 101c. The count unit 101c is a counter for determining whether to change the power state from the normal energized state to the power saving state. The count unit 101c may be provided in the printing apparatus 101. The analysis unit 101b and count unit 101c can be realized, for example, by using the embodiment of the LAN controller 1001 illustrated in FIG. 10.

According to one version, when the power state is in a power saving state, a power state control unit 101d restores the power state to the normal energized state from the power saving state if a Wake Up packet is received by the packet communication unit 101a. Furthermore, if the value of the counter in the count unit 101c becomes "0" as a Sleep In packet is received by the packet communication unit 101a and "1" is subtracted from the value of the counter, the power state control unit 101d changes the power state from the normal energized state to the power saving state. This power state control unit 101d can be realized, for example, by using the embodiment of the LAN controller 1001 and power source 1002 illustrated in FIG. 10.

In one version, if the power state is changed to the normal energized state by the power state control unit 101d, a printing execution unit 101e executes printing processing based on the packets received by the packet communication unit 101a. This printing execution unit 101e can be realized, for example, by using the embodiment of the controller 1004 and the apparatus body illustrated in FIG. 10.

Figure 3:
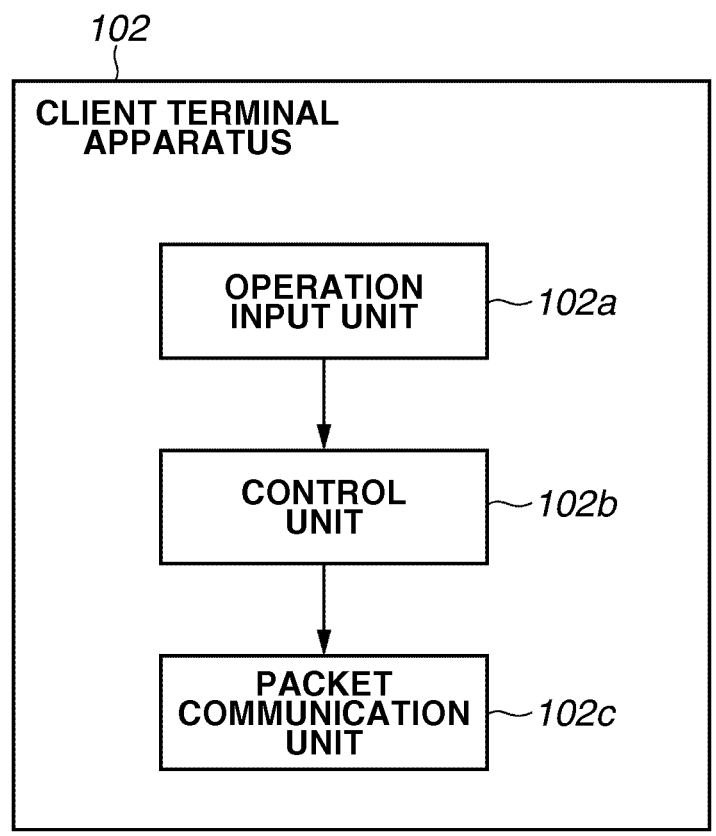
FIG. 3 is a diagram illustrating an example of a functional configuration of a client terminal apparatus according to the first exemplary embodiment of the present invention.

FIG. 3 is a diagram illustrating an example of a functional configuration of the client terminal apparatus 102. Since the functional configuration of the server 103 may be similar to and even the same as the functional configuration of the client terminal apparatus 102, a description thereof is not repeated here. Further, since the internal configurations of the client terminal apparatus 102 and the server 103 can be realized by a computer apparatus (e.g., a PC), a description thereof is omitted here.

In the example as shown in FIG. 3, an operation input unit 102a receives operations from a user interface (e.g., at least one of a keyboard, mouse and the like) made by a user (i.e., and operator). A control unit 102b generates packets, which are transmitted to the printing apparatus 101 and the like based on the contents of the operations received by the operation input unit 102a. A packet communication unit 102c transmits the packets generated by the control unit 102b to the printing apparatus 101.

According to one aspect of the present exemplary embodiment, when the control unit 102b starts using the printing apparatus 101, the control unit 102b generates a Wake Up packet, and the packet communication unit 102c transmits that Wake Up packet to the printing apparatus 101. Then, the control unit 102b generates the packets, which may be used to perform the printing by the printing apparatus 101, and the packet communication unit 102c transmits those packets to the printing apparatus 101. Once all or a predetermined number of the packets for performing the printing by the printing apparatus 101 are transmitted to the printing apparatus 101, the packet communication unit 102c generates a Sleep In packet, and the packet communication unit 102c transmits that Sleep In packet to the printing apparatus 101.

While in the present exemplary embodiment it has been described that the Wake Up packet and the Sleep In packet are generated each time printing is performed, the Wake Up packet and the Sleep In packet can also optionally be generated in advance.

Figure 4:
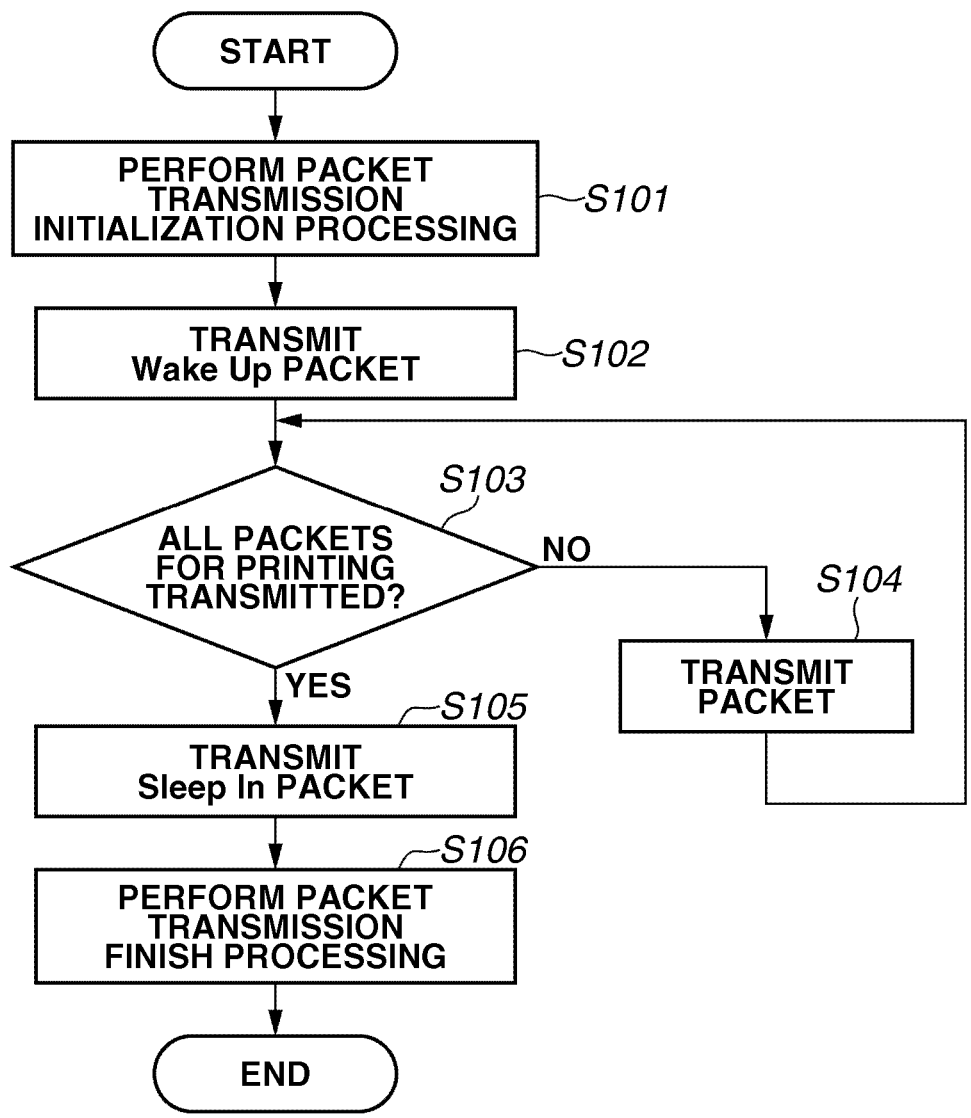
FIG. 4 is a flowchart illustrating an example of processing of a client terminal apparatus when executing printing in the printing apparatus according to the first exemplary embodiment of the present invention.

Next, an example of the processing of the client terminal apparatus 102 when executing printing in the printing apparatus 101 will be described referring to the flowchart of FIG. 4. Since the processing of the server 103 may be similar to the processing of the client terminal apparatus 102, a description thereof is not repeated here.

First, in step S101, the control unit 102b performs packet transmission initialization processing based on the contents of an operation received by the operation input unit 102a, and starts the processing for performing packet transmission.

Next, in step S102, the control unit 102b generates a Wake Up packet, and the packet communication unit 102c transmits that Wake Up packet to the printing apparatus 101.

As described above, a Wake Up packet may be a packet for restoring the power state to the normal energized state from the power saving state. The Wake Up packet may include, for example, a predetermined character string, such as "Wake Up", or a code in a packet. The printing apparatus 101 can thus determine that the received packet is an order to restore the power state to the normal energized state from the power saving state based on this predetermined character string or code. Furthermore, the protocol used in the Wake Up packet may be a dedicated, unique protocol or a standard protocol, so long as it is agreed upon in advance between the printing apparatus 101 and the client terminal apparatus 102.

Next, in step S103, the control unit 102b determines whether all of the packets for performing the printing process by the printing apparatus 101 have been transmitted to the printing apparatus 101. If it is determined that all of the packets for performing the printing process by the printing apparatus 101 have not been transmitted to the printing apparatus 101 (NO in step S103), the processing proceeds to step S104. Then, in step S104, the control unit 102b generates the packets (i.e., the remaining packets) for performing the printing by the printing apparatus 101, and the packet communication unit 102c transmits those packets to the printing apparatus 101. Processing then returns to step S103. Steps S103 and S104 are repeatedly performed until all of the packets for performing the printing by the printing apparatus 101 are transmitted.

Then, in step S103, if it is determined that all of the packets for performing the printing by the printing apparatus 101 have been transmitted to the printing apparatus 101 (YES in step S103), the processing proceeds to step S105. Then, in step S105, the packet communication unit 102c generates a Sleep In packet, and the packet communication unit 102c transmits the Sleep In packet to the printing apparatus 101.

As described above, a Sleep In packet is a packet for permitting the power state to be changed from the normal energized state to the power saving state. The Sleep In packet may include, for example, a predetermined character string, such as "Sleep In", or code in a packet. The printing apparatus 101 can thus determine that the received packet indicates permission for changing the power state to the power saving state from the normal energized state based on this predetermined character string or code. Furthermore, the protocol used in the Sleep In packet may be a dedicated, unique protocol or a standard protocol, so long as it is agreed upon in advance between the printing apparatus 101 and the client terminal apparatus 102. Finally, in step S106, the control unit 102b performs packet transmission finish processing, and finishes packet transmission (i.e., the processing example performed in the flowchart of FIG. 4).

Figure 5:
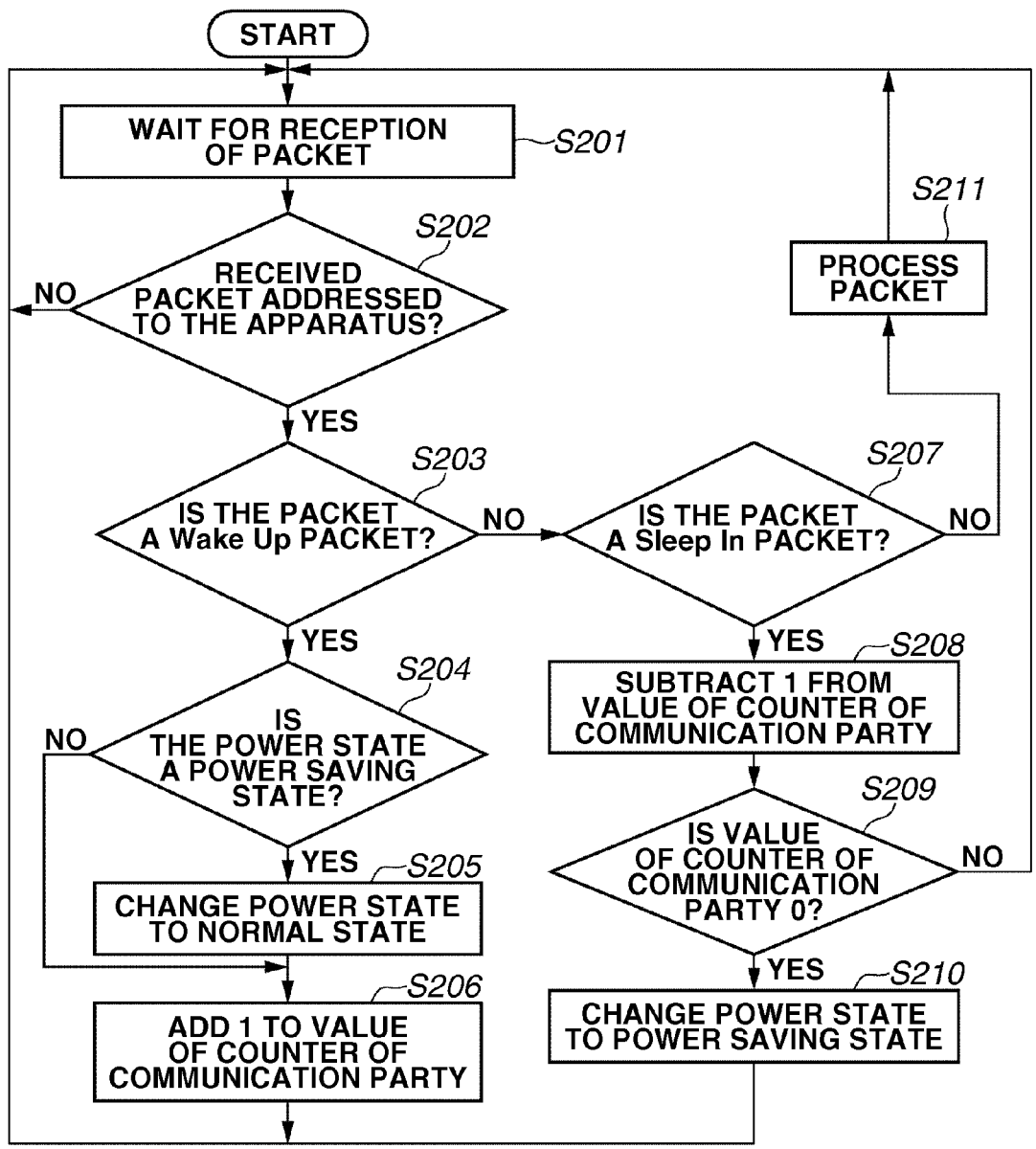
FIG. 5 is a flowchart illustrating an example of processing of a printing apparatus when a packet is received from a client terminal apparatus or a server and printing processing is performed according to the first exemplary embodiment of the present invention.

Next, an example of the processing of the printing apparatus 101 when receiving a packet from one or more external apparatuses, such as one or more of the client terminal apparatus 102 and the server 103, and performing printing processing, will be described referring to the flowchart of FIG. 5.

First, in step S201, the packet communication unit 101a waits for the reception of a packet.

Next, in step S202, the packet communication unit 101a determines whether a packet addressed to the apparatus has been received. By "Packet addressed to the apparatus" it is meant that the packet is one which the apparatus is intended to process. In TCP/IP, a packet addressed to the apparatus is a packet that has a transmission destination to the IP address of the apparatus. If the apparatus is participating in multicasting, broadcast packets may also be packets addressed to the apparatus.

If it is determined that a packet addressed to the apparatus has not been received (NO in step S202), the processing returns to step S201, and steps S201 and S202 are repeatedly performed until a packet addressed to the apparatus has been received.

On the other hand, if a packet addressed to the apparatus has been received (YES in step S202), the processing proceeds to step S203. Then, in step S203, the analysis unit 101b determines whether the received packet is a Wake Up packet. If it is determined that the received packet is not a Wake Up packet (NO in step S203), the processing proceeds to step S207 described below.

On the other hand, if the received packet is a Wake Up packet (YES in step S203), the processing proceeds to step S204. Then, in step S204, the power state control unit 101d determines whether the power state of the apparatus is the power saving state. If it is determined that the power state of the apparatus is the power saving state (YES in step S204), the processing proceeds to step S205. Then, in step S205, the power state control unit 101d changes the power state of the apparatus from the power saving state to the normal energized state. Processing then proceeds to step S206.

Thus, in the present exemplary embodiment, an example of first instruction information may be realized, for example, by a Wake Up packet, and an example of a first acquisition unit may be realized, for example, by executing steps S202 and S203. Furthermore, an example of a second power state change unit may be realized, for example, by executing steps S204 and S205. On the other hand, if it is determined in step S204 that the power state of the apparatus is not the power saving state (NO in step S204), step S205 is skipped and the processing proceeds to step S206.

Then, in step S206, the analysis unit 101b adds "1" to the count value of the counter of the communication party, which is a counter included in the count unit 101c, and then the processing returns to step S201. The communication party maybe, for example, one or more of the client terminal apparatus 102 and the server 103, and there can also be a plurality of communication parties.

Thus, in the present exemplary embodiment, an example of a counting value is realized by the count value, for example, and an example of a first counting unit may be realized by executing step S206.

In step S203, if it is determined that the received packet is not a Wake Up packet (NO in step S203), the processing proceeds to step S207. Then, in step S207, the analysis unit 101b determines whether the received packet is a Sleep In packet. If it is determined that the received packet is not a Sleep In packet (NO in step S207), the processing proceeds to the step S211 described below.

On the other hand, if the received packet is a Sleep In packet (YES in step S207), the processing proceeds to step S208. Then, in step S208, the analysis unit 101b subtracts "1" from the count value of the counter of the communication party, which is a counter included in the count unit 101c.

Thus, in the present exemplary embodiment, an example of second instruction information may be realized by a Sleep In packet, for example, and an example of a second acquisition unit may be realized, for example, by executing steps S202 and S207. Further, an example of a second counting unit may be realized, for example, by executing step S208.

Next, in step S209, the power state control unit 101d determines whether the count value of the counter of the communication party, which is a counter included in the count unit 101c, is "0". If it is determined that the count value of the counter of the communication party is not "0" (NO in step S209), the processing returns to step S201.

On the other hand, if the count value of the counter of the communication party is "0" (YES in step S209), the processing proceeds to step S210. Then, in step S210, the power state control unit 101d changes the power state from the normal energized state to the power saving state. Then, the processing returns to step S201.

Thus, in the present exemplary embodiment, an example of a power state change unit may be realized, for example, by executing steps S204 and S205.

In step S207, if it is determined that the received packet is not a Sleep In packet (NO in step S207), the processing proceeds to step S211. If the processing proceeds to step S211, this means that packets for printing have been received, and thus the printing execution unit 101e executes printing based on those packets. Then, the processing returns to step S201. The processing executed in step S211 is not limited to printing, and can be any kind of packet processing, except for the packet processing of the Wake Up packet or the Sleep In packet.

Furthermore, in step S210, to protect consumable parts, such as the hard disk and the like, when changing the power state to the power saving state, the printing apparatus 101 may be configured so that the power state is not changed to the power saving state unless a predetermined period of time has elapsed since the change to the energized state. If the printing apparatus 101 is thus configured, the power state changes to the power saving state once all of the conditions (i.e., the condition of step S209 and the condition that the predetermined period of time has elapsed) are satisfied.

Furthermore, for example, sometimes the power state of the printing apparatus 101 may be forcibly turned into the power saving state based on an operation or the like performed by a user on the printing apparatus 101, or the power state of the printing apparatus 101 maybe forcibly turned into the power saving state in order to protect the hard disk of the printing apparatus 101. In such cases, the printing apparatus 101 may receive a Sleep In packet when it is in the power saving state. Furthermore, the printing apparatus 101 may also receive a Sleep In packet when it is in the power saving state, in a case where a Wake Up packet transmitted from an external apparatus, when the printing apparatus 101 is in the power saving state, has not been received, and a Sleep In packet is subsequently received from the external apparatus.

When a Sleep In packet is received when the printing apparatus 101 is already in the power saving state in this manner, the printing apparatus 101 does not return the power state to the normal energized state.

Figure 6:
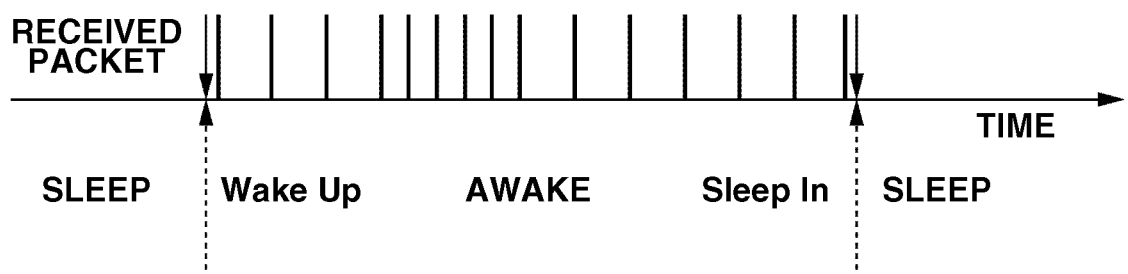
FIG. 6 is a diagram illustrating an example of a temporal relationship between a packet received by the printing apparatus and the power state according to the first exemplary embodiment of the present invention.

Thus, according to aspects of the present exemplary embodiment, if the printing apparatus 101 receives a Wake Up packet from an external apparatus when the power state of the apparatus is the power saving state, the power state is turned into a normal energized state and "1" is added to the counter value. Further, if the packet communication unit 101a receives a Sleep In packet from an external apparatus, "1" is subtracted from the counter value. Then, if the counter value is "0", the power state is turned into the power saving state. Therefore, as illustrated in the example of FIG. 6, even if the printing apparatus 101 communicates with a plurality of apparatuses, the power state can optionally be made to be a normal energized state when appropriate, and the power state can be relatively efficiently changed to the power saving state. In case the printing apparatus 101 communicates with a plurality of external apparatuses, such as user personal computers, a predetermined value, such as "1", may be added to or subtracted from a counter value shared with the plurality of external apparatuses, and the predetermined value may also or alternatively be added to or subtracted from a counter value corresponding to each individual external apparatus.

Furthermore, according to aspects of the present exemplary embodiment, if the counter value corresponding to the Sleep In packet transmission source becomes "0", the power state is turned into the power saving state. However, the embodiment is not limited to thereto. For example, the power state can also be turned into the power saving state when the counter value corresponding to the Sleep In packet transmission source is less than "0". As a result, the power state can be turned into the power saving state even if the printing apparatus 101 does not receive a Wake Up packet.

Furthermore, according to aspects of the present exemplary embodiment, "1" is added to the value of the "counter of the communication party" if a Wake Up packet is received, and "1" is subtracted from the value of the "counter of the communication party" if a Sleep In packet is received. Moreover, when the value of that counter is "0", the power state is changed from a normal energized state to the power saving state. However, the embodiment is not limited to this. For example, the plus and minus signs of the values to be added or subtracted can be reversed. Namely, for example, "1" may be subtracted from the value of the "counter of the communication party" if a Wake Up packet is received, and "1" can be added to the value of the "counter of the communication party" if a Sleep In packet is received. Further, the values to be added or subtracted can be a predetermined value other than "1" (e.g., "2"). In addition, the power state can be changed from a normal energized state to the power saving state when, for example, a comparison of the number of times that a Wake Up packet is received and the number of times that a Sleep In packet is received shows that the number of times is the same or the number of times that a Sleep In packet is received is greater. Namely, as long as changing the power state from a normal energized state to the power saving state is based on (e.g., related to) the acquisition state of the Wake Up packets and the Sleep In packets, the determination criteria for performing the change can be appropriately selected.

Furthermore, while the present exemplary embodiment has been described using the printing apparatus 101 as an example of the electronic apparatus, so long as the electronic apparatus has a function for operating in the power saving state, which operates with a lower power state than the power of the normal energized state, the electronic apparatus is not limited to a printing apparatus. For example, the electronic apparatus can be a multifunction peripheral (MFP) and the like.

Next, a second exemplary embodiment of the present invention will be described. In the second exemplary embodiment, in addition to the processing performed in the first exemplary embodiment, when a predetermined time has elapsed since the last communication with an external apparatus, the power state of the printing apparatus 101 is changed (e.g., automatically) to the power saving state. Thus, a main difference between the present exemplary embodiment and the first exemplary embodiment lies in the part of the processing that occurs when the power state of the printing apparatus 101 is changed to the power saving state. Therefore, in the description of the present exemplary embodiment, the parts that are the same or similar to those in the first exemplary embodiment are denoted by the same reference numerals as given in FIGS. 1 to 5, and thus a detailed description of such parts is not repeated.

Figure 7:
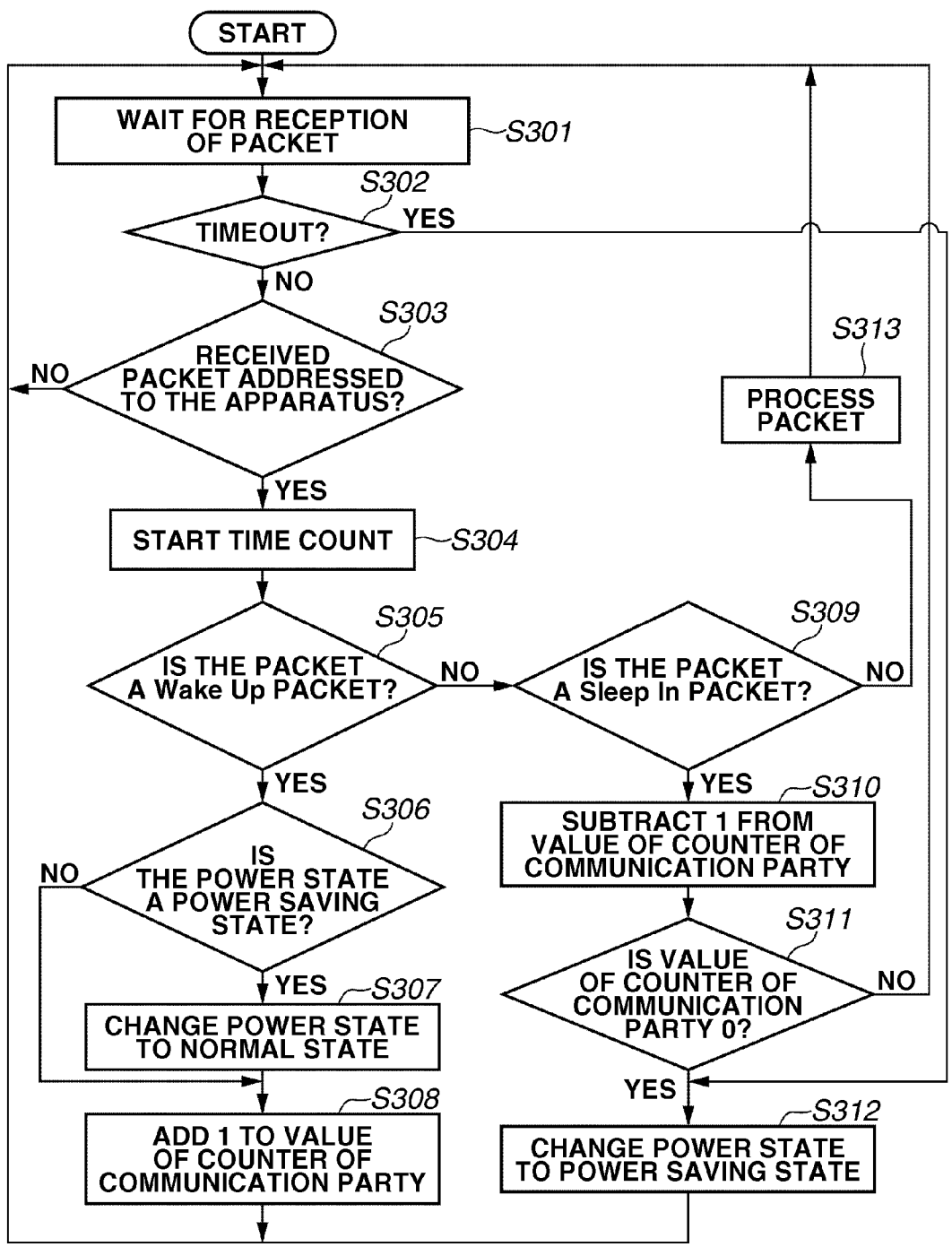
FIG. 7 is a flowchart illustrating an example of the processing of a printing apparatus when a packet is received from a client terminal apparatus or a server and printing processing is performed according to a second exemplary embodiment of the present invention.

An example of the processing of the printing apparatus 101 when receiving a packet from the client terminal apparatus 102 or the server 103 and performing the printing processing will now be described referring to the flowchart of FIG. 7.

First, in step S301, the packet communication unit 101a waits for the reception of a packet.

Next, in step S302, the analysis unit 101b determines whether a timer has timed out. The timer used in the determination in step S302 is the timer to be set in the step S304 described below. Further, a pre-set predetermined value may be used as the threshold to be used in the determination in step S302. This predetermined value can be set, for example, by the analysis unit 101b based on an operation performed by the user for the printing apparatus 101.

If it is determined in step S302 that the timer has timed out (YES in step S302), the processing proceeds to the step S312 described below.

On the other hand, if the timer has not timed out (NO in step S302), the processing proceeds to step S303. Then, in step S303, the packet communication unit 101a determines whether a packet addressed to the apparatus has been received. If it is determined that a packet addressed to the apparatus has not been received (NO in step S303), the processing returns to step S301.

On the other hand, if a packet addressed to the apparatus has been received (YES in step S303), the processing proceeds to step S304. Then, in step S304, the analysis unit 101b sets the timer (i.e., starts the timer count), which is included in the analysis unit 101b. As described above, the timeout of this timer may be determined in step S302. Further, in step S304, if the timer has already been set (if the timer has already started counting), the analysis unit 101b may clear and reset the timer.

Thus, in the present exemplary embodiment, an example of a time counting unit may be realized, for example, by executing step S304.

Next, in step S305, the analysis unit 101b determines whether the received packet is a Wake Up packet. If it is determined that the received packet is not a Wake Up packet (NO in step S305), the processing proceeds to step S309 described below.

Thus, in the present exemplary embodiment, an example of first instruction information may be realized, for example, by a Wake Up packet, and an example of a first acquisition unit may be realized, for example, by executing steps S303 and S305.

On the other hand, if the received packet is a Wake Up packet (YES in step S305), the processing proceeds to step S306. Then, in step S306, the power state control unit 101d determines whether the power state of the apparatus is the power saving state. If it is determined that the power state of the apparatus is the power saving state (YES in step S306), the processing proceeds to step S307. Then, in step S307, the power state control unit 101d changes the power state of the apparatus from the power saving state to the normal energized state. Then, the processing proceeds to step S308.

Thus, in the present exemplary embodiment, an example of a second power state change unit maybe realized, for example, by executing steps S306 and S307.

On the other hand, if it is determined in step S306 that the power state of the apparatus is not the power saving state (NO in step S306), step S307 is skipped and the processing proceeds to step S308.

Then, in step S308, the analysis unit 101b adds "1" to the count value of the counter of the communication party, which is a counter included in the count unit 101c, and then the processing returns to step S301.

Thus, in the present exemplary embodiment, an example of the counting value maybe realized, for example, by the count value and an example of a first counting unit may be realized by executing step S308. In step S305, if it is determined that the received packet is not a Wake Up packet (NO in step S305), the processing proceeds to step S309. Then, in step S309, the analysis unit 101b determines whether the received packet is a Sleep In packet. If it is determined that the received packet is not a Sleep In packet (NO in step S309), the processing proceeds to step S313 described below.

Thus, in the present exemplary embodiment, an example of second instruction information may be realized, for example, by a Sleep In packet and an example of a second acquisition unit may be realized, for example, by executing steps S303 and S309.

On the other hand, if the received packet is a Sleep In packet (YES in step S309), the processing proceeds to step S310. Then, in step S310, the analysis unit 101b subtracts "1" from the count value of the counter of the communication party, which is a counter included in the count unit 101c.

Thus, in the present exemplary embodiment, an example of a second counting unit may be realized, for example, by executing step S310.

Next, in step S311, the power state control unit 101d determines whether the count value of the counter of the communication party, which is a counter included in the count unit 101c, is "0". If it is determined that the count value of the counter of the communication party is not "0" (NO in step S311), the processing returns to step S301.

On the other hand, if the count value of the counter of the communication party is "0" (YES in step S311), the processing proceeds to step S312. Then, in step S312, the power state control unit 101d changes the power state from the normal energized state to the power saving state. Then, the processing returns to step S301. As described above, in step S312, the power state is changed from the normal energized state to the power saving state when it is determined in step S302 that the timer has timed out.

Thus, in the present exemplary embodiment, an example of a power state change unit may be realized, for example, by executing steps S302, S311, and S312.

In step S309, if it is determined that the received packet is not a Sleep In packet (NO in step S309), the processing proceeds to step S313. If the processing proceeds to step S313, this means that packets for printing have been received, and thus the printing execution unit 101e executes printing based on those packets. Then, the processing returns to step S301.

Furthermore, in the present exemplary embodiment, the printing apparatus 101 can be configured so that the power state changes to the power saving state only when the condition of step S311 and the condition that the predetermined time has elapsed, which is set for protecting consumable parts (e.g., a hard disk), are satisfied, thereby enabling the change to the power saving state. Furthermore, the printing apparatus 101 can also be configured so that the power state is not returned to the normal energized state when a Sleep In packet is received when it is in the power saving state.

Thus, according to aspects of the present exemplary embodiment, when a predetermined time has elapsed since the last communication with an external apparatus, the power state of the printing apparatus 101 is changed to the power saving state regardless of the count value. Therefore, in addition to the effects described for the first exemplary embodiment, the present exemplary embodiment provides the effect that the power state can be changed relatively expeditiously, reliably, and easily to the power saving state, even when the printing apparatus 101 fails to receive a Sleep In packet.

Furthermore, in the present exemplary embodiment, the various modification examples described in the first exemplary embodiment can also be employed. Next, the third exemplary embodiment of the present invention will be described. In the second exemplary embodiment, it is determined whether a timer has been timed out. However, in the present exemplary embodiment, a timer is set for each of one or a plurality of external apparatuses, and a timeout is determined for each of the one or a plurality of external apparatuses. Furthermore, in the present exemplary embodiment, even if the counter value corresponding to the communication party is "0", the power state is not changed to the power saving state unless communication with all of the external apparatuses that are communicating is finished. Thus, the main difference between the present exemplary embodiment and the first and second exemplary embodiments lies in the part of the processing that occurs when the power state of the printing apparatus 101 is changed to the power saving state. Therefore, in the description of the present exemplary embodiment, the parts that are similar to those in the first exemplary embodiment are denoted by the same reference numerals as given in FIGS. 1 to 7, and thus a detailed description of such parts is not repeated.

Figure 8:
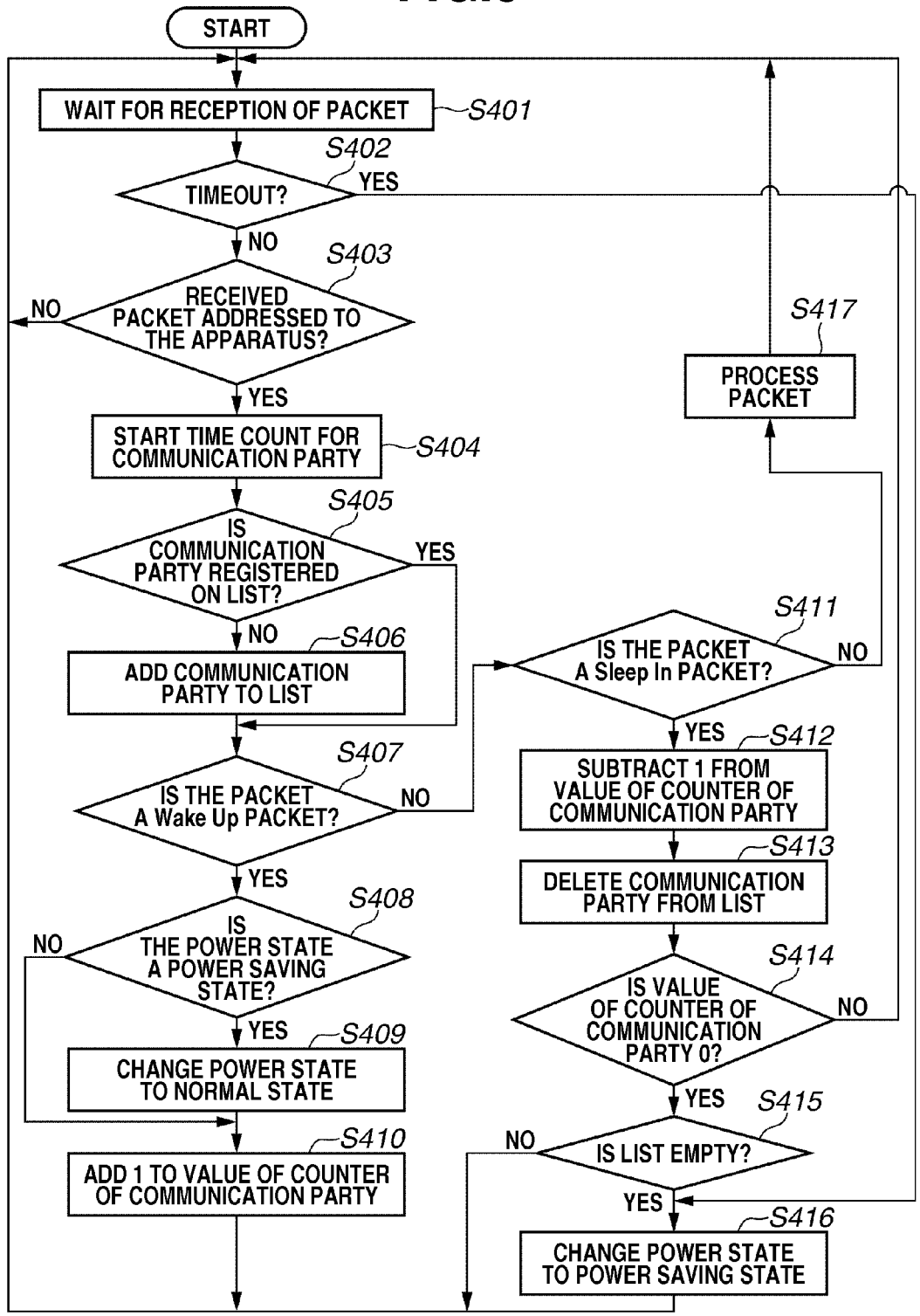
FIG. 8 is a flowchart illustrating an example of processing of a printing apparatus when a packet is received from a client terminal apparatus or a server and printing processing is performed according to a third exemplary embodiment of the present invention.

An example of the processing of the printing apparatus 101 when receiving a packet from the client terminal apparatus 102 or the server 103 and performing the printing processing will now be described referring to the flowchart of FIG. 8.

First, in step S401, the packet communication unit 101*a* waits for the reception of a packet.

Next, in step S402, the analysis unit 101*b* determines whether all of the timers have timed out. If it is determined that the timers have timed out (YES in step S402), the processing proceeds to the below-described step S416.

On the other hand, if the timers have not timed out (NO in step S402), the processing proceeds to step S403. Then, in step S403, the packet communication unit 101*a* determines whether a packet addressed to the apparatus has been received. If it is determined that a packet addressed to the apparatus has not been received (NO in step S403), the processing returns to step S401.

On the other hand, if a packet addressed to the apparatus has been received (YES in step S403), the processing proceeds to step S404. Then, in step S404, the analysis unit 101*b* sets the timer for the transmission source of the packet received in step S403 from among the timers included in the analysis unit 101*b* (e.g., starts the timer count). Furthermore, in step S404, if the timer has already been set (e.g., if the timer has already started counting), the analysis unit 101*b* may clear and reset the timer.

Thus, in the present exemplary embodiment, an example of a time counting unit may be realized, for example, by executing step S404.

Next, in step S405, the analysis unit 101*b* determines whether the address of the external apparatus, which is the transmission source of the packet received in step S403, is registered on the list included in the analysis unit 101*b*. FIG. 9 is a diagram illustrating an example of such a list, in which external apparatus addresses are registered. As illustrated in FIG. 9, in the present exemplary embodiment, as an example of external apparatus addresses, the IP addresses of the external apparatuses are registered on a list 800. However, any identifying information can be registered on the list 800, as long as the information can uniquely identify the external apparatuses.

If it is determined in step S405 that the address of the external apparatus, which is the transmission source of the packet received in step S403, is not registered on the list 800 (NO in step S405), the processing proceeds to step S406. Then, in step S406, the analysis unit 101*b* adds the address of the external apparatus (i.e., communication party), which is the transmission source of the packet received in step S403 to the list 800. Then, the processing proceeds to step S407.

Thus, in the present exemplary embodiment, an example of a registration unit may be realized, for example, by executing step S406.

On the other hand, if it is determined that the address of the external apparatus, which is the transmission source of the packet received in step S403, is registered on the list 800 (YES in step S405), step S406 is skipped and the processing proceeds to step S407.

Then, in step S407, the analysis unit 101*b* determines whether the received packet is a Wake Up packet. If it is determined that the received packet is not a Wake Up packet (NO in step S407), the processing proceeds to step S411 described below.

Thus, in the present exemplary embodiment, an example of first instruction information may be realized, for example, by a Wake Up packet, and an example of a first acquisition unit may be realized, for example, by executing steps S403 and S407.

On the other hand, if the received packet is a Wake Up packet (YES in step S407), the processing proceeds to step S408. Then, in step S408, the power state control unit 101*d* determines whether the power state of the apparatus is the power saving state. If it is determined that the power state of the apparatus is the power saving state (YES in step S408), the processing proceeds to step S409. Then, in step S409, the power state control unit 101*d* changes the power state of the apparatus from the power saving state to the normal energized state. Then, the processing proceeds to step S410.

Thus, in the present exemplary embodiment an example of a second power state change unit maybe realized, for example, by executing steps S408 and S409.

On the other hand, if it is determined in step S408 that the power state of the apparatus is not the power saving state (NO in step S408), step S409 is skipped and the processing proceeds to step S410.

Then, in step S410, the analysis unit 101*b* adds "1" to the count value of the counter of the communication party, which is a counter included in the count unit 101*c*, and then the processing returns to step S401.

Thus, in the present exemplary embodiment, an example of the counting value is realized, for example, by the count value and an example of a first counting unit may be realized by executing step S410.

In step S407, if it is determined that the received packet is not a Wake Up packet (NO in step S407), the processing proceeds to step S411. Then, in step S411, the analysis unit 101b determines whether the received packet is a Sleep In packet. If it is determined that the received packet is not a Sleep In packet (NO in step S411), the processing proceeds to the step S417 described below.

Thus, in the present exemplary embodiment, an example of second instruction information may be realized, for example, by a Sleep In packet and an example of a second acquisition unit may be realized, for example, by executing steps S403 and S411.

On the other hand, if the analysis unit 101b determines that the received packet is a Sleep In packet (YES in step S411), the processing proceeds to step S412. Then, in step S412, the analysis unit 101b subtracts "1" from the count value of the counter of the communication party, which is a counter included in the count unit 101c.

Thus, in the present exemplary embodiment, for example, an example of a second counting unit may be realized by executing step S412.

Next, in step S413, the address (IP address) of the communication party is deleted from the list 800.

Thus, in the present exemplary embodiment, an example of a deletion unit may be realized, for example, by executing step S413. Next, in step S414, the power state control unit 101d determines whether the count value of the counter of the communication party, which is a counter included in the count unit 101c, is "0". If it is determined that the count value of the counter of the communication party is not "0" (NO in step S414), the processing returns to step S401.

On the other hand, if the count value of the counter of the communication party is "0" (YES in step S414), the processing proceeds to step S415. Then, in step S415, the analysis unit 101b determines whether an address (IP address) is registered on the list 800. If it is determined that an address (IP address) is registered on the list 800 (NO in step S415), the processing returns to step S401.

On the other hand, if an address (IP address) is not registered on the list, and it is determined that the list 800 is empty (YES in step S415), the processing proceeds to step S416. Then, in step S416, the power state control unit 101d changes the power state from the normal energized state to the power saving state. Then, the processing returns to step S401. As described above, in step S416, the power state may also be changed from the normal energized state to the power saving state also when it is determined, in step S402, that the timers have timed out.

Thus, in the present exemplary embodiment, an example of a power state change unit may be realized, for example, by executing steps S402, S414, S415, and S416.

In step S411, if it is determined that the received packet is not a Sleep In packet (NO in step S411), the processing proceeds to step S417. If the processing proceeds to step S417, this means that packets for printing have been received, and thus the printing execution unit 101e executes printing based on those packets. Then, the processing returns to step S401.

Furthermore, according to aspects of the present exemplary embodiment, the printing apparatus 101 can be configured so that the power state changes to the power saving state only when the condition of steps S414 and S415 and the condition that the predetermined time set for protecting consumable parts (e.g., a hard disk) has elapsed, are satisfied. Further, the printing apparatus 101 can also be configured so that the power state is not switched to the energized state when a Sleep In packet is received when it is in the power saving state.

Thus, according to aspects of the present exemplary embodiment a timer is set for each of one or a plurality of external apparatuses, and it is determined whether all of those apparatus are timed out. Therefore, in addition to the effects described in the first and second exemplary embodiments, the conditions for changing the power state of the printing apparatus 101 to the power saving state maybe set in more detail. Furthermore, according to aspects of the present exemplary embodiment, since the power state is changed to the power saving state after communication with all of the external apparatuses is finished, disruption of the communication between an external apparatus and the printing apparatus 101 may be relatively reliably prevented.

Furthermore, the registration/deletion of an external apparatus address on/from the list 800, and the changing of the power state of the printing apparatus 101 to the power saving state when the list 800 is empty, can also be employed in the first and second exemplary embodiments. In such a case, for example, after step S202 or S304, the processing of steps S405 and S406 can be performed, and after step S209 or S311, the processing of step S415 can be performed. Further, the setting of a timer for each of one or a plurality of external apparatuses and determining whether all of those apparatus are timed out can also be employed in the second exemplary embodiment. In addition, in the present exemplary embodiment, the various modification examples, such as those described in the first exemplary embodiment, can also be employed.

Accordingly, aspects of the present invention may be directed to an electronic apparatus, such as a printing apparatus, which performs communication with a plurality of external apparatuses, and which can relatively efficiently change a power state to a power saving state.

Furthermore, according to exemplary embodiments of the present invention, the electronic apparatus may acquire first instruction information, which instructs changing of the power state to the normal energized state, and second instruction information, which instructs changing of the power state from the normal energized state to the power saving state. Further, the electronic apparatus may change the power state from the normal energized state to the power saving state based on the acquisition state of the first instruction information and the second instruction information. Therefore, the power state can be changed from the normal energized state to the power saving state at time based on the acquisition state of the first instruction information and the second instruction information. Thus, the power state can be relatively efficiently changed to the power saving state even when the electronic apparatus communicates with a plurality of external apparatuses, such as first and second external apparatuses.

According to one aspect of the invention, each of the units configuring the electronic apparatus and each of the steps of the power state control method in the exemplary embodiments of the present invention, can be realized by operating a program having computer-executable instructions that is stored in a random access memory (RAM) or read only memory (ROM) of a computer. These computer-readable instructions, and a computer-readable recording medium on which the instructions are stored, are included as aspects of the present invention.

Furthermore, aspects of the present invention may also be embodied as a system, an apparatus, a method, a program having computer-executable instructions, a storage medium and the like. For example, aspects of the present invention can be applied in a system configured by a plurality of devices, or in an apparatus configured by only one device.

Furthermore, aspects of the present invention may include, for example, the supply of a software program having computer-executable instructions for realizing the functions of the exemplary embodiments (e.g., in the exemplary embodiments, a program having computer-executable instructions corresponding to the flowcharts illustrated in FIGS. 4 to 8) to a system or an apparatus either directly or remotely. Aspects of the present invention may also include cases in which a computer of a system or an apparatus realizes the reading and execution of the supplied program code.

Therefore, the program code having computer-executable instructions itself, which is to be installed in the computer to realize the functional processing of the present invention with a computer, may also realize aspects according to the present invention. That is, the computer program having computer-executable instructions itself for realizing the functional processing of the present invention may also be included as an embodiment of the present invention.

For example, the program can be at least one of an object code, a program executed by an interpreter, script data supplied to an OS and the like, as long as it has the function of a program.

Examples of the recording medium for supplying the program having the computer-executable instructions may include at least one of a floppy disk, a hard disk, an optical disk, a magneto optical disk (MO), a compact disc read only memory (CD-ROM), a CD-recordable (CD-R), a CD-rewritable (CD-RW) and the like. Other examples may include at least one of a magnetic tape, a non-volatile memory card, a ROM, a digital versatile disk (DVD-ROM, DVD-R) and the like.

In addition, an example of a method for supplying the program may include using a browser of a client computer to connect to an Internet homepage (i.e., web page). In one version, the computer program itself according to aspects of the exemplary embodiments of the present invention, or a compressed file containing an auto-install function, can also be supplied from the web page by downloading onto a recording medium, such as a hard disk.

Furthermore, in one version, the present invention can also be realized by dividing the program code having computer-executable instructions that constitutes a program according to an embodiment of the present invention into a plurality of files, and downloading each of those files from different web pages. For example, a World Wide Web (WWW) server, which allows a plurality of users to download the program files for realizing functional processing according to exemplary embodiments of the present invention by a computer, may also be included as an aspect of the present invention.

Furthermore, in one version the program having the computer-executable instructions for the exemplary embodiments of the present invention can also be encrypted, stored on a storage medium, such as a CD-ROM, and distributed to a user. A user satisfying certain conditions may be allowed to download key information for deciphering the encryption from a web page via the Internet. By using that key information, the encrypted program can be executed to install on a computer, and realizes the functions.

Furthermore, in one version the functions of the exemplary embodiments can also be realized by having a computer execute a read program. In addition, on one version the functions of the exemplary embodiments can also be realized by having an OS operating on a computer perform all or part of the actual processing based on the computer-executable instructions in the program.

In addition, in one version, the functions of the exemplary embodiments can be realized by writing a program having computer-executable instructions read from a recording medium into a memory that is provided on a function expansion board, which is inserted into a computer or a function expansion unit connected to the computer. Subsequently, based on an instruction by that program, a central processing unit (CPU) and the like provided on that function expansion board or function expansion unit may perform all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-048538 filed Feb. 28, 2008, which is hereby incorporated by reference herein in its entirety.

What is claimed is:

1. An electronic apparatus which communicates with a plurality of external apparatuses, comprising:
   a first acquisition unit configured to acquire, before information for performing printing, first instruction information transmitted from any of the plurality of external apparatuses, which instructs to change a power state of the electronic apparatus to a normal energized state, at least one of the first instruction information being transmitted from a first external apparatus;
   a printing information acquisition unit configured to acquire, after the first instruction information, information for performing printing transmitted from one or more of the external apparatuses;
   a second acquisition unit configured to acquire, after the first information and the information for printing, second instruction information transmitted from any of the plurality of external apparatuses, which instructs to change the power state to a power saving state from the normal energized state, at least one of the second instruction information being transmitted from a second external apparatus that is other than the first external apparatus;
   a counting unit configured to count the first instruction information acquired by the first acquisition unit and count the second instruction information acquired by the second acquisition unit;
   a power state change unit configured to change the power state of the electronic apparatus from the normal energized state to the power saving state based on a counting value of the counting unit;
   a registration unit configured to register on a list information relating to an external apparatus with which communication is performed; and
   a deletion unit configured to delete from the list information relating to the external apparatus, which is a transmission source of the second instruction information, when the second acquisition unit acquires the second instruction information,
   wherein the power state change unit changes the power state from the normal energized state to the power saving state when the acquisition state of the first instruction information and the second instruction information is a predetermined state, and the information relating to the external apparatus is not registered on the list.

2. The electronic apparatus according to claim 1, further comprising:
a second power state change unit configured to change the power state from the power saving state to the normal energized state when the first acquisition unit acquires the first instruction information transmitted from any of the plurality of external apparatuses, and the power state is the power saving state,
wherein the second acquisition unit is configured to acquire the second instruction information transmitted from any one of the plurality of external apparatuses after the power state is changed from the power saving state to the normal energized state by the second power state change unit.

3. The electronic apparatus according to claim 1, further comprising:
a time counting unit configured to count time from when information transmitted from any of the plurality of external apparatuses is received until subsequent information is received,
wherein the power state change unit changes the power state from the normal energized state to the power saving state when the time counted by the time counting unit reaches a predetermined time, regardless of the acquisition state of the first instruction information and the second instruction information.

4. A method for controlling a power state of an electronic apparatus which communicates with a plurality of external apparatuses, the method comprising:
acquiring, before information for performing printing, first instruction information transmitted to the electronic apparatus from any of the plurality of external apparatuses, which instructs to change the power state to a normal energized state, at least one of the first instruction information being transmitted from a first external apparatus;
acquiring, after the first instruction information, information for performing printing transmitted from one or more of the external apparatuses;
acquiring, after the first information and the information for printing, second instruction information transmitted to the electronic apparatus from any of the plurality of external apparatuses, which instructs to change the power state to a power saving state, at least one of the second instruction information being transmitted from a second external apparatus that is other than the first external apparatus;
counting the acquired first instruction information and counting the acquired second instruction information via a counting unit in the electronic apparatus;
changing the power state of the electronic apparatus from the normal energized state to the power saving state based on a counting value in the counting unit
registering on a list information relating to an external apparatus with which communication is performed; and
deleting from the list information relating to the external apparatus, which is a transmission source of the second instruction information, when acquiring the second instruction information,
wherein the power state changes from the normal energized state to the power saving state when the acquisition state of the first instruction information and the second instruction information is a predetermined state, and the information relating to the external apparatus is not registered on the list.

5. A non-transitory computer-readable storage medium for storing a computer program that executes on a computer a method for controlling a power state of an electronic apparatus which communicates with a plurality of external apparatuses, the method comprising:
acquiring, before information for performing printing, first instruction information transmitted to the electronic apparatus from any of the plurality of external apparatuses, which instructs to change the power state to a normal energized state, at least one of the first instruction information being transmitted from a first external apparatus;
acquiring, after the first instruction information, information for performing printing transmitted from one or more of the external apparatuses;
acquiring, after the first information and the information for printing, second instruction information transmitted to the electronic apparatus from any of the plurality of external apparatuses, which instructs to change the power state to a power saving state, at least one of the second instruction information being transmitted from a second external apparatus that is other than the first external apparatus;
counting the acquired first instruction information and counting the acquired second instruction information via a counting unit in the electronic apparatus;
changing the power state from the normal energized state to the power saving state based on a counting value in the counting unit
registering on a list information relating to an external apparatus with which communication is performed; and
deleting from the list information relating to the external apparatus, which is a transmission source of the second instruction information, when acquiring the second instruction information,
wherein the power state changes from the normal energized state to the power saving state when the acquisition state of the first instruction information and the second instruction information is a predetermined state, and the information relating to the external apparatus is not registered on the list.

* * * * *